United States Patent
Rhee et al.

(10) Patent No.: US 9,246,697 B2
(45) Date of Patent: Jan. 26, 2016

(54) COMMUNICATION DEVICE, MULTICAST CONTROL METHOD, AND SCHEDULING CONTROL METHOD

(71) Applicant: Korea Advanced Institute of Science and Technology, Daejeon (KR)

(72) Inventors: June Koo Rhee, Daejeon (KR); Dujeong Lee, Seoul (KR); Kyounghye Kim, Seoul (KR); Junhyuk Kim, Daegu (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 114 days.

(21) Appl. No.: 14/164,076

(22) Filed: Jan. 24, 2014

(65) Prior Publication Data

US 2014/0211796 A1    Jul. 31, 2014

(30) Foreign Application Priority Data

Jan. 29, 2013  (KR) .................. 10-2013-0009944
Jun. 5, 2013   (KR) .................. 10-2013-0064793

(51) Int. Cl.
   *H04L 12/18*    (2006.01)

(52) U.S. Cl.
   CPC .................. *H04L 12/1881* (2013.01)

(58) Field of Classification Search
   None
   See application file for complete search history.

(56) References Cited

U.S. PATENT DOCUMENTS

2009/0067533 A1*  3/2009  Yuan et al. ............ 375/267
2010/0146357 A1*  6/2010  Larsson ................ 714/750

FOREIGN PATENT DOCUMENTS

KR    10-2012-0078197 A    7/2012

OTHER PUBLICATIONS

Dujeong Lee, et al., "Optimal Multicast Control for Simple Network Coding", IEEE Transactions on Vehicular Technology, Apr. 2013, pp. 1-7.
Cleju, et al., "Selection of Network Coding Nodes for Minimal Playback Delay in Streaming Overlays," IEEE Transactions on Multimedia, Oct. 2011, pp. 1103-1115, vol. 13, No. 5.

* cited by examiner

*Primary Examiner* — Diane Lo
(74) *Attorney, Agent, or Firm* — McDermott Will & Emery LLP

(57) ABSTRACT

A communication device, a multicast control method, and a scheduling control method are disclosed. The communication device includes: a decoding buffer that stores a first multicast packet received from a first node and a second multicast packet received from a second node; an encoder that performs network coding of the first and second multicast packets; and a transmitter that transmits the network-coded packets output from the encoder to the first node and the second node.

5 Claims, 8 Drawing Sheets

(Time: 1)

(Time: 2)

(Time: 3)

COMMUNICATION DEVICE, MULTICAST CONTROL METHOD, AND SCHEDULING CONTROL METHOD

CROSS-REFERENCE TO RELATED APPLICATION

This application claims priority to and the benefit of Korean Patent Application Nos. 10-2013-0009944 and 10-2013-0064793 filed in the Korean Intellectual Property Office on Jan. 29, 2013 and Jun. 5, 2013, the entire contents of which are incorporated herein by reference.

BACKGROUND OF THE INVENTION (a) Field of the Invention

The present invention relates to a communication device, a multicast control method, and a scheduling control method.

(b) Description of the Related Art

Network coding is a technique which allows a relay node to code multiple packets by linear coupling or an exclusive OR operation (XOR) and forward them, and a receiving node to decode a coded signal and receive the packets during a packet transfer process.

One of the simplest examples is DAF (decode-and-forward) two-way relaying. DAF is applicable when two nodes exchange data.

According to DAF, two nodes, i.e., node A and node B, in a network send data. Relay node R relays between node A and node B.

First, node A sends packet X to relay node R. Then, node B sends packet Y to relay node R. Node A and node B store the packet X and packet Y they have sent in local buffers.

Hereupon, relay node R linearly couples the received packet X and packet Y and at the same time forwards them to node A and node B. Node A and node B decode and receive packet X and packet Y, respectively, using the packet X and the packet Y which have been stored in their local buffers.

However, there is a limitation that the conventional DAF can be applied only when two nodes in a multi-hop network send and receive data in a linear phase.

When using multicasting without network coding in a multi-hop network in the conventional art, packet transmission occurs as follows.

1) node 1 transmits packet (a) to node 2 and node 3, respectively, which are connected to it.

2) node 4 transmits packet (b) to node 3 which is connected to it.

3) node 3 transmits packet (a) to node 4.

4) node 3 transmits packet (b) to node 1 and node 2.

In this way, packet transmission is carried out in four stages in the conventional art.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a communication device, a multicast control method, and a scheduling control method which allow for multicast transmission using network coding.

An exemplary embodiment of the present invention provides a communication device. The communication device includes: a decoding buffer that stores a first multicast packet received from a first node and a second multicast packet received from a second node; an encoder that performs network coding of the first and second multicast packets; and a transmitter that transmits the network-coded packets output from the encoder to the first node and the second node.

The communication device may further include a queue that is separate from the decoding buffer and is matched to buffer nodes having multicast packets and a destination node to store the multicast packets.

The communication device may further include a scheduler that schedules the transmission priority of each of the first and second multicast packets by using the number of packets stored in the queue and the set of all cases where the destination node is divided into a plurality of subsets, and combines the scheduling results of the first and second multicast packets together to schedule the transmission priority of the network-coded packets.

The scheduler may calculate a scheduling weighted value of the network-coded packets by calculating a scheduling weighted value of the first multicast packet and a scheduling weighted value of the second multicast packet and adding the calculated weighted values together.

The scheduler may compare the scheduling weighted value of the first multicast packet, the scheduling weighted value of the second multicast packet, and the scheduling weighted value of the network-coded packets, choose the largest scheduling weighted value, and determine transmission of the packet corresponding to the chosen scheduling weighted value.

Another embodiment of the present invention provides a multicast control method. The multicast control method includes: transmitting a first multicast packet to at least one neighboring node and a relay node from one of a plurality of nodes constituting a network; performing network coding of the first multicast packet and a second multicast packet received from a destination node and transmitting the first and second multicast packets to the node and the at least one neighboring node from the relay node; and decoding the network-coded packets by using the first multicast packet to enable the node and the at least one neighboring node to acquire the second multicast packet.

The multicast control method further includes, after transmitting the first multicast packet, storing the first multicast packet in a decoding buffer of the node, and storing the first multicast packet in a decoding buffer of the at least one neighboring node.

In the acquiring of the second multicast packet, the first multicast packet stored in decoding buffers may be used.

The multicast control method may further include, after transmitting to the node, and the at least one neighboring node: receiving the network-coded packets from the relay node by the destination node; and acquiring the first multicast packet by decoding the network-coded packets by using the second multicast packet.

The multicast control method further includes, before receiving the network-coded packets, storing the second multicast packet in the decoding buffer of the destination node.

In the acquiring of the first multicast packet, the second multicast packet stored in the decoding buffer may be used.

The multicast control method further includes storing multicast packets in queues of the node, the at least one neighboring node, the relay node, and the destination node, which are separate from the decoding buffers.

Each queue may match a multicast packet to the destination node and the buffer node storing the multicast packet in the decoding buffer.

Yet another embodiment of the present invention provides a scheduling control method. The scheduling control method includes: scheduling a transmission priority of a first multicast packet by one of a plurality of nodes constituting a network; scheduling a transmission priority of a second multicast packet; and scheduling a transmission priority of the first and second multicast packets, which are network-coded, according to the scheduling of the first multicast packet and the scheduling of the second multicast packet.

In the scheduling of the transmission priority of the network-coded packets, a scheduling weighted value of the network-coded packets may be calculated by a sum of a scheduling weighted value of the first multicast packet and a scheduling weighted value of the second multicast packet.

The scheduling control method may further include, after scheduling the transmission priority of the network-coded packets: comparing the scheduling weighted value of the first multicast packet, the scheduling weighted value of the second multicast packet, and the scheduling weighted value of the network-coded packets to choose the largest scheduling weighted value; and transmitting the packet corresponding to the chosen scheduling weighted value.

The transmission priority of the first multicast packet and the second multicast packet is calculated by the following equation:

$$w_{(k,\{i_1,\ldots,i_n\})}^{D,C}(t) = Q_k^{D,C}(t) - \min_{B \in \mathcal{B}(D,n),c} \sum_{j=1}^{n} Q_{i_j}^{b_j,c}$$

where $Q_k^{D,C}(t)$ denotes the number of packets at a given time t whose destination node set is D and which are stored in the packet queue $Q_k^{D,C}$ of buffer node C, $\mathcal{B}(D,n)$ denotes a destination node assigned to the jth receiving node, and $i_j$ is the jth receiving node, and as a consequence, $$Q_{i_j}^{B_j,\{k,i_1,\ldots,i_n\}}(t)$$

denotes the queue length of the receiving node versus B, and $$\min_{B \in \mathcal{B}(D,n),c} \sum_{j=1}^{n} Q_{i_j}^{b_j,\{k,i_1,\ldots,i_n\}}$$

denotes the sum of queue lengths of B by which the sum of queue lengths of receiving nodes is minimal.

According to an embodiment of the present invention, multicast performance, i.e., an amount of data transmitted per unit time, can be increased. Furthermore, the present invention can achieve maximum effect in a multi-hop network having a shared medium, and is applicable to a general wireless network.

DETAILED DESCRIPTION OF THE EMBODIMENTS

Figure 1:
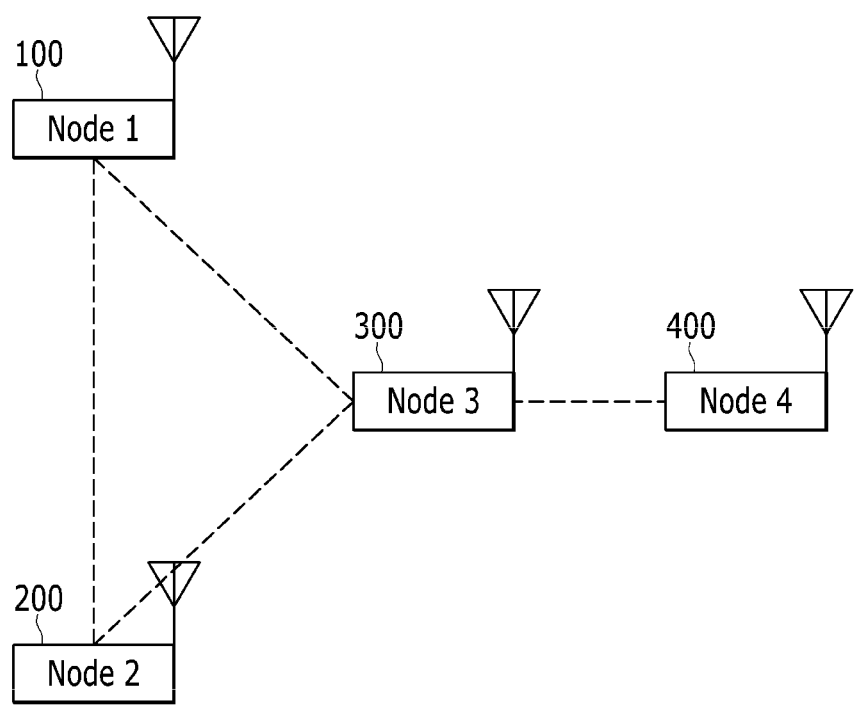
FIG. 1 is a block diagram of a network according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, when a certain part "includes" a certain component, this indicates that the part may further include another component instead of excluding another component unless there is a different disclosure.

In addition, terms, such as "... unit," "... er/or," "module," or "block," disclosed in the specification indicates a unit for processing at least one function or operation, and this may be implemented by hardware, software, or a combination of both.

Hereinafter, a communication device, a multicast control method, and a scheduling control method according to an exemplary embodiment of the present invention will be described in detail with reference to the drawings.

Figure 2:
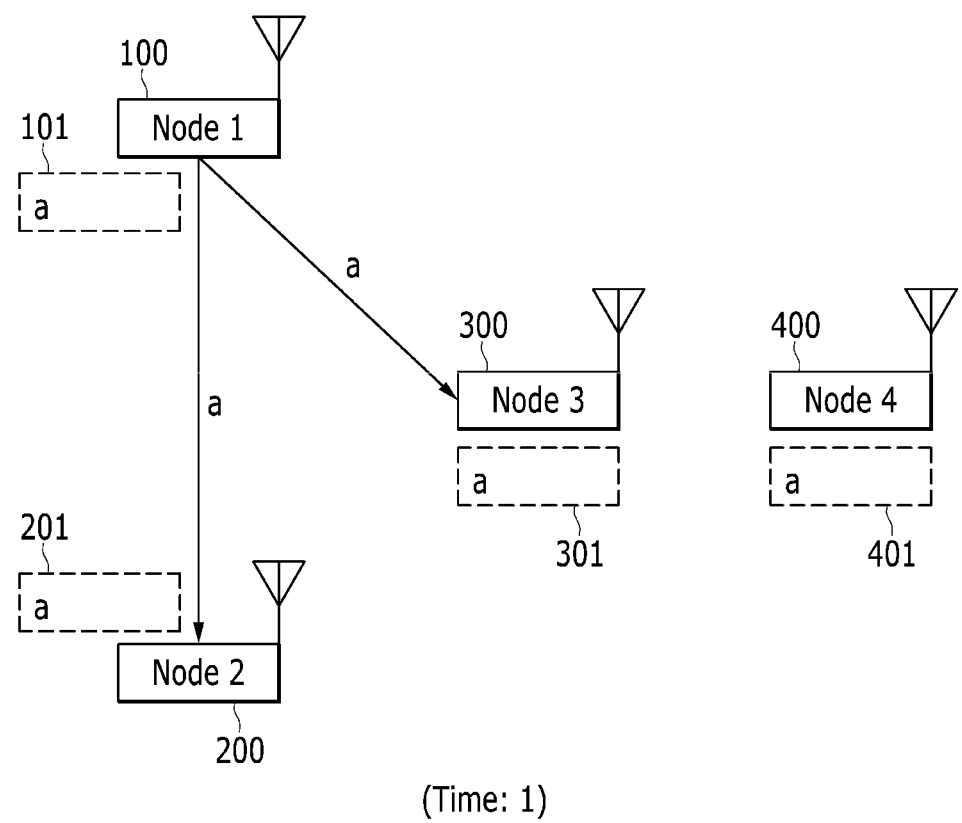
FIG. 2 shows multicast transmission at Time 1 according to an exemplary embodiment of the present invention.
Figure 3:
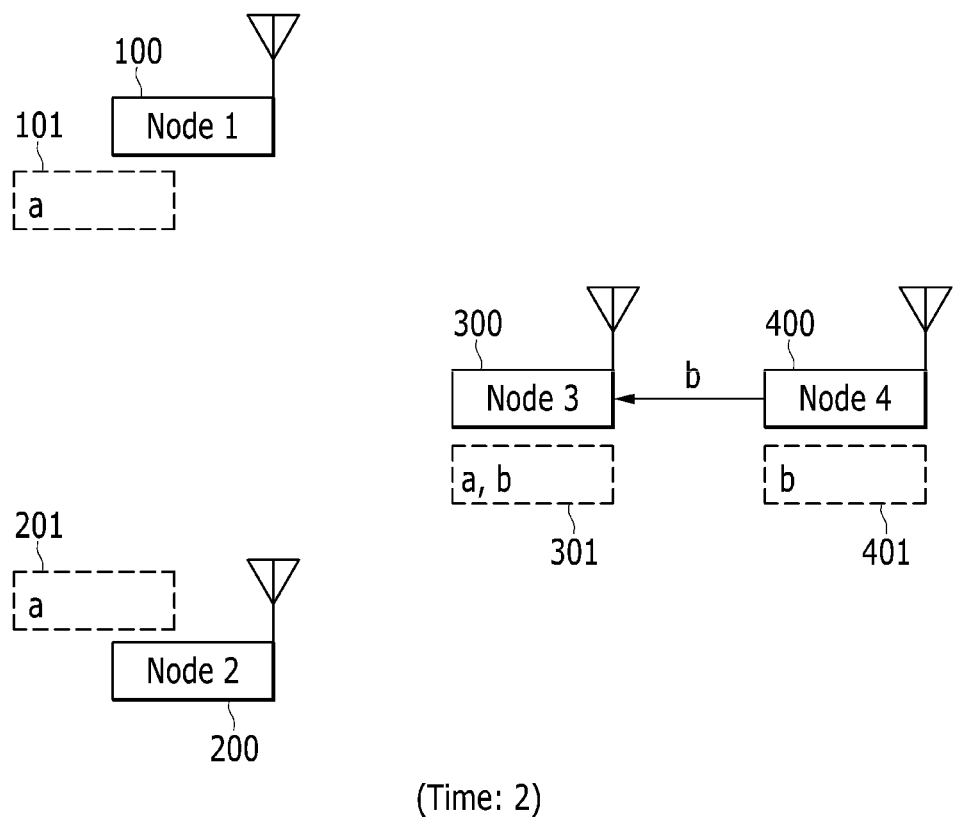
FIG. 3 shows multicast transmission at Time 2 according to an exemplary embodiment of the present invention.
Figure 4:
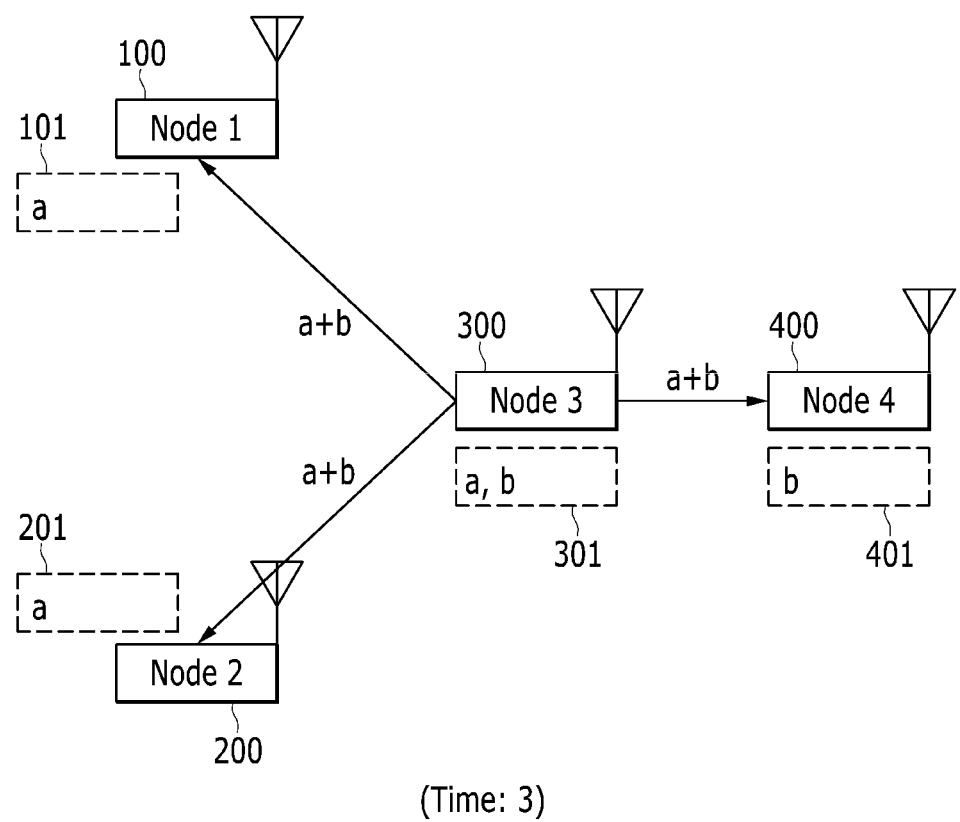
FIG. 4 shows multicast transmission at Time 3 according to an exemplary embodiment of the present invention.

FIG. 1 is a block diagram of a network according to an exemplary embodiment of the present invention, FIG. 2 shows multicast transmission at Time 1 according to an exemplary embodiment of the present invention, FIG. 3 shows multicast transmission at Time 2 according to an exemplary embodiment of the present invention, and FIG. 4 shows multicast transmission at Time 3 according to an exemplary embodiment of the present invention.

First of all, referring to FIG. 1, a network consists of four nodes, i.e., node 1 (100), node 2 (200), node 3 (300), and node 4 (400). The nodes 100, 200, 300, and 400 can send and receive packets only to and from neighboring nodes connected to them with dotted lines. That is, node 1 (100) can send and receive packets to and from node 2 (200) and node 3 (300). Node 4 (400) can send and receive packets to and from node 3 (300). Node 3 (300) can send and receive packets to and from node 1 (100), node 2 (200), and node 4 (400).

The nodes 100, 200, 300, and 400 cannot simultaneously send and receive packets because they have a single wireless interface.

There are two multicast flows generated by node 1 (100) and node 4 (400), and these flows transmit (a) and (b) to {node2, node4} and {node1, node2}, respectively.

That is, the first multicast flow goes from node 1 (100) to node 2 (200) and from node 1 (100) to node 4 (400), and the second multicast flow goes from node 4 (400) to node 1 (100) and from node 4 (400) to node 2 (200).

Each node 100, 200, 300, and 400 stores, in a decoding buffer, packets that they have generated and received from neighboring nodes to achieve efficient multicasting, which will be described in further detail with reference to FIGS. 2, 3, and 4.

The solid line box next to each node denotes a decoding buffer. That is, each node 100, 200, 300, and 400 has their own decoding buffer 101, 201, 301, and 401.

Referring to FIG. 2, node 1 (100) generates packet (a) and transmits it to node 2 (200) and node 3 (300) at Time: 1. Then, packet (a) is stored in the decoding buffers 101, 201, and 301 of node 1 (100), node 2 (200), and node 3 (300).

Referring to FIG. 3, node 4 (400) generates packet (b) and transmits it node 3 (300) at Time: 2. Then, packet (b) is stored in the decoding buffers 301 and 401 of node 3 (300) and node 4 (400)

Referring to FIG. 4, node 3 (300) linearly couples packet (a) and packet (b) stored in the decoding buffer 301 at Time: 3 into a+b. Then, node 3 (300) transmits the linearly coupled packets (a+b) to node 1 (100), node 2 (200), and node 4 (400).

Then, node 1 (200) acquires packet (b) by performing an (a+b)−a operation using packet (a) stored in the decoding buffer 101.

Also, node 2 (200) acquires packet (b) by performing an (a+b)−a operation using packet (a) stored in the decoding buffer 201.

Also, node 4 (400) acquires packet (a) by performing an (a+b)−b operation using packet (b) stored in the decoding buffer 401.

In this way, multicast transmission to nodes 1, 2, and 4 is completed through a total of three multicast transmissions. This multicast transmission improves performance by 33%.

Figure 5:
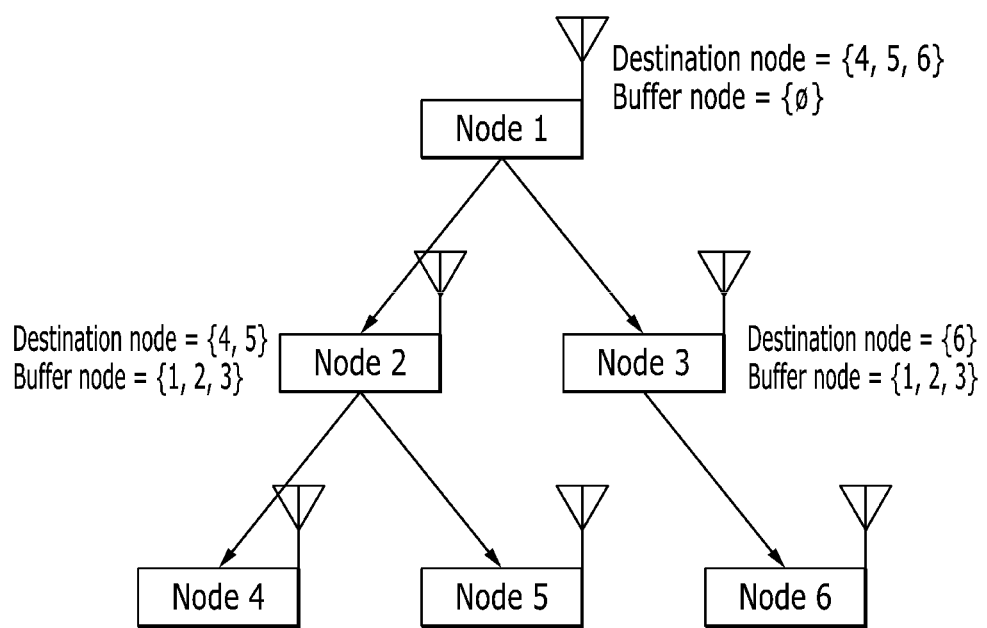
FIG. 5 is a block diagram for explaining the concepts of buffer nodes and destination nodes according to an exemplary embodiment of the present invention.

FIG. 5 is a block diagram for explaining the concepts of buffer nodes and destination nodes according to an exemplary embodiment of the present invention.

As used herein, buffer nodes C refer to nodes which have particular packets stored in their decoding buffers. Destination nodes D refer to nodes to which particular packets should be forwarded. The destination node D of each packet is different for each relay node due to the nature of multicasting.

Referring to FIG. 5, node 1 is multicasting to node 4, node 5, and node 6.

The destination nodes D of node 1 include node 4, node 5, and node 6. After node 1 is branched into node 2 and node 3, the destination nodes of node 2 are node 4 and node 5 and the destination node D of node 3 is node 6.

If a multicast packet is generated by node 1 and transmitted to node 2, node 3, and node 4, the destination nodes D of node 1 are {4, 5, 6}. Because the packet is stored in buffers upon transmission/reception, the buffer node C is Ø when the packet is firstly generated.

If the packet generated by node 1 is transmitted to node 2 and node 3, the destination nodes of node 2 are {4, 5} and the buffer nodes C of node 2 are {1, 2, 3}. The destination node D of node 3 is {6}, and the buffer nodes C of node 3 are {1, 2, 3}.

The packet transmitted or received by each node is stored in a packet queue ($Q_k^{D,C}$) by using "destination node-buffer node" pair information.

Here, if node k receives a packet whose destination node set is D and whose buffer node is C, the packet queue of node k is $Q_k^{D,C}$. That is, node k stores the received packet in $Q_k^{D,C}$. Such a packet queue can be subdivided by flow when necessary.

Also, the number of packets in the packet queue $Q_k^{D,C}$ at a given time t is equal to $Q_k^{D,C}(t)$.

Each node copies the packets transmitted by them and the packets received from neighboring nodes and manages these packets in the decoding buffers 101, 201, 301, and 401, which are memory spaces separated from the packet queue.

The decoding buffers 101, 201, 301, and 401 have limited space. If the decoding buffers 101, 201, 301, and 401 are full, they are managed by using various queue management techniques, for example, FIFO.

(k, {$i_1$, . . . , $i_n$}) is a multicast link from node k to k's neighboring nodes $i_1, \ldots, i_n$, which is represented by (k, I). A unicast link from k to $i_1$ is represented by (k, {$i_1$}).

$\mathcal{B}$(D, n) refers to the set of all cases where the destination node set D is divided into n subsets n. If D={1, 2, 3}, n=2, $\mathcal{B}$(D, n) is represented by the following Equation 1.

$$\mathcal{B}(D,n)=\{[\{1\},\{2,3\}],[\{2\},\{1,3\}],[\{3\},\{1,2\}],[\{2,3\},\{1\}],[\{1,3\},\{2\}],[\{1,2\},\{3\}]\} \quad \text{(Equation 1)}$$

Figure 6:
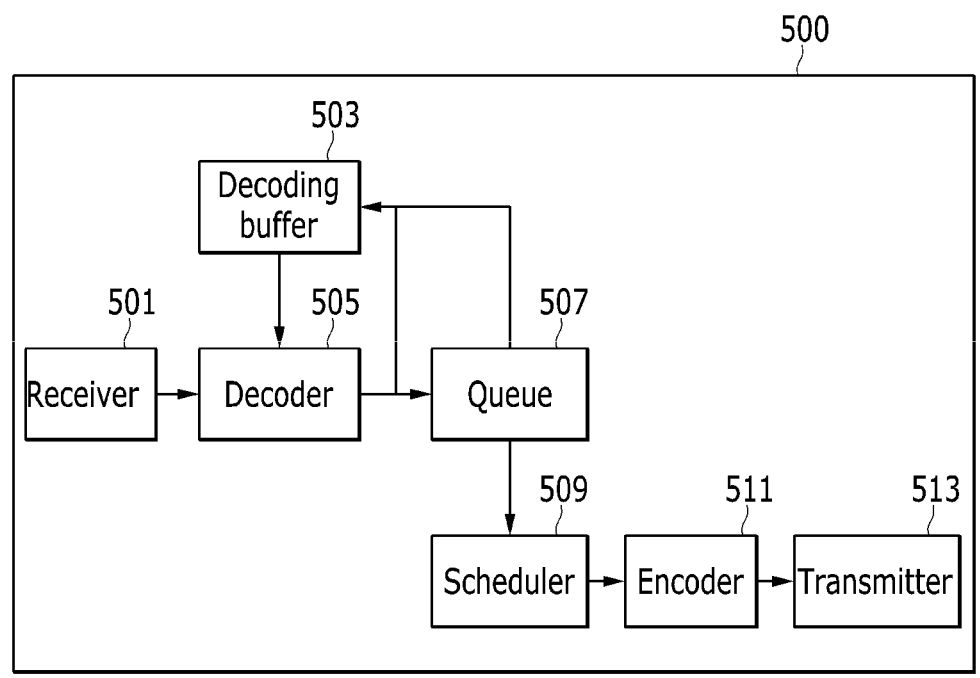
FIG. 6 shows the configuration of a communication device according to an exemplary embodiment of the present invention.

FIG. 6 shows the configuration of a communication device according to an exemplary embodiment of the present invention.

The communication device may operate as node 1 (100), node 2 (200), node 3 (300), or node 4 (400) in FIGS. 1 through 4.

Referring to FIG. 6, a communication device 500 includes a receiver 501, a decoding buffer 503, a decoder 505, a queue 507, a scheduler 509, an encoder 511, and a transmitter 513.

The receiver 501 receives multicast packets from at least one neighboring node. If the communication device 500 operates as the first node 100 of FIGS. 1 through 4, the receiver 501 receives network-coded packets (a+b) from the relay node 300.

If the communication device 500 operates as the second node 200 of FIGS. 1 through 4, the receiver 501 receives a first multicast packet (a) from the source node 100. Then, the receiver 510 receives the network-coded packets (a+b) from the second node 200.

If the communication device 500 operates as the third node 300 of FIGS. 1 through 4, the receiver 501 receives the first multicast packet (a) from the source node 100. Then, the receiver 510 receives a second multicast packet (b) from the destination node 400.

If the communication device 500 operates as the fourth node 400 of FIGS. 1 through 4, the receiver 501 receives the network-coded packets (a+b) from the third node 300.

The decoding buffer 503 stores multicast packets received by the receiver or multicast packets generated and transmitted by it.

If the decoding buffer 503 is the decoding buffer 101 of the first node 100 of FIGS. 1 through 4 or the decoding buffer 201 of the second node 200 of FIGS. 1 through 4, it stores the first multicast packet a.

If the decoding buffer 503 is the decoding buffer 101 of the third node 300 of FIGS. 1 through 4, it stores the first multicast packet (a) and the second multicast packet b.

If the decoding buffer 503 is the decoding buffer 101 of the fourth node 400 of FIGS. 1 through 4, it stores the second multicast packet b.

If the decoder 505 operates as the first node 100, second node 200, or fourth node 400 of FIGS. 1 through 4, it decodes the network-coded packets (a+b) by using the multicast packets stored in the decoding buffer 503.

If the decoder 505 operates as the first node 100 or second node 200 of FIGS. 1 through 4, it extracts the first multicast packet (a) from the decoding buffer 503, and decodes the network-coded packets (a+b) by using the first multicast packet a, thereby acquiring the second multicast packet b.

If the decoder 505 operates as the fourth node 400 of FIGS. 1 through 4, it extracts the second multicast packet (b) from the decoding buffer 503, and decodes the network-coded packets (a+b) by using the second multicast packet b, thereby acquiring the first multicast packet a.

The queue 507 is configured in the same manner as the above-described packet queue, and is embodied as a packet queue $Q_k^{D,C}$ based on "destination node-buffer node" pair information. That is, the queue 507 matches each multicast packet to a destination node and a buffer node and stores it.

The scheduler 509 schedules the sequence of transmission of multicast packets stored in the decoding buffer 503 to at least one neighboring node.

If the encoder 511 operates as the third node 300 of FIGS. 1 though 4, i.e., a relay node, it performs network coding of a plurality of received multicast packets.

For example, the encoder 511 performs network coding of the received first multicast packet (a) and second multicast packet (b) and outputs packets (a+b).

The transmitter 513 transmits multicast packets to neighboring nodes.

If the transmitter 513 operates as the first node 100 of FIGS. 1 through 4, it transmits the first multicast packet (a) to neighboring nodes.

If the transmitter 513 operates as the fourth node 400 of FIGS. 1 through 4, it transmits the second multicast packet (b) to neighboring nodes.

If the transmitter 513 operates as the third node 300 of FIGS. 1 through 4, it transmits the network-coded packets (a+b) to neighboring nodes.

Figure 7:
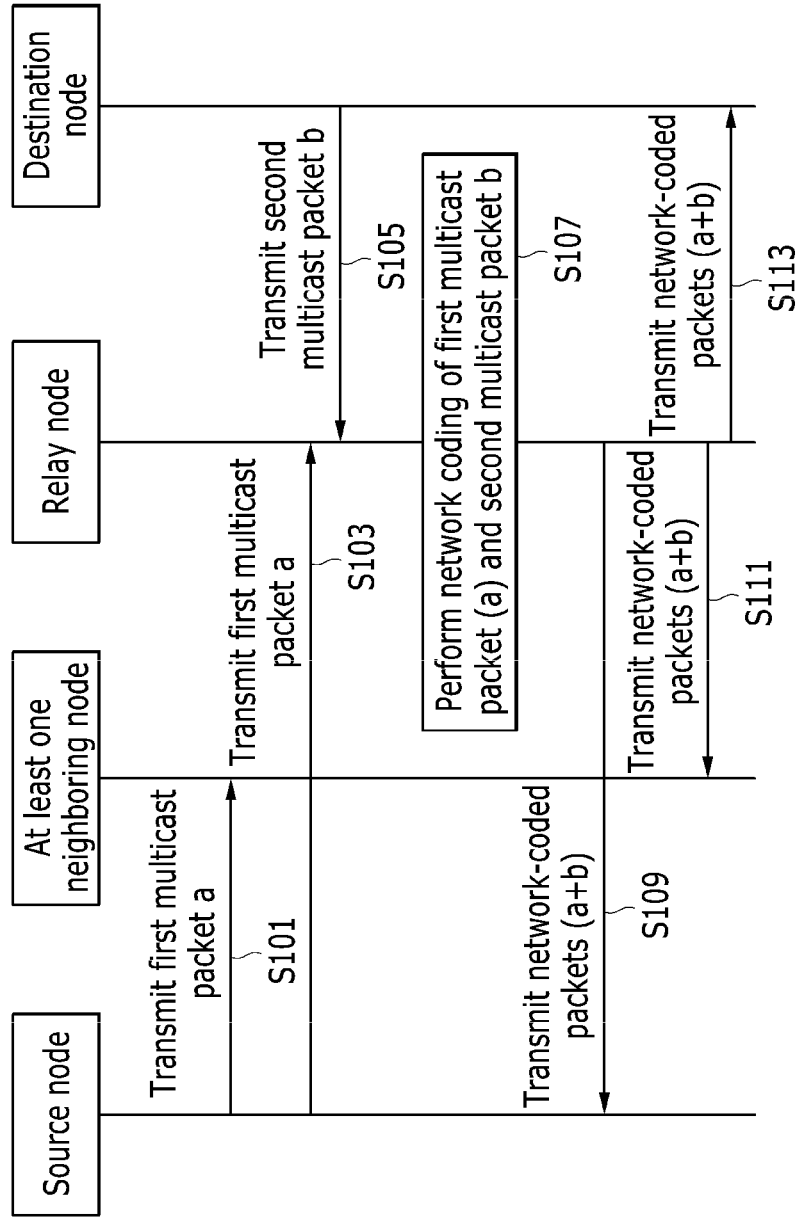
FIG. 7 is a flowchart showing a multicast control method according to an exemplary embodiment of the present invention.

FIG. 7 is a flowchart showing a multicast control method according to an exemplary embodiment of the present invention.

Referring to FIG. 7, the source node 100 transmits a first multicast packet (a) to at least one neighboring node, i.e., node 2 (200) and node 3 (300) (S101 and S103).

Also, the destination node 400 transmits a second multicast packet (b) to a neighboring node, i.e., node 3 (300) (S105).

Then, the relay node 300 performs network coding of the first and second multicast packets (a) and (b) (S107) and transmits the network-coded packets to at least one neighboring node, i.e., node 1 (100), node 2 (200), and node 4 (400) (S109, S111, and S113).

Figure 8:
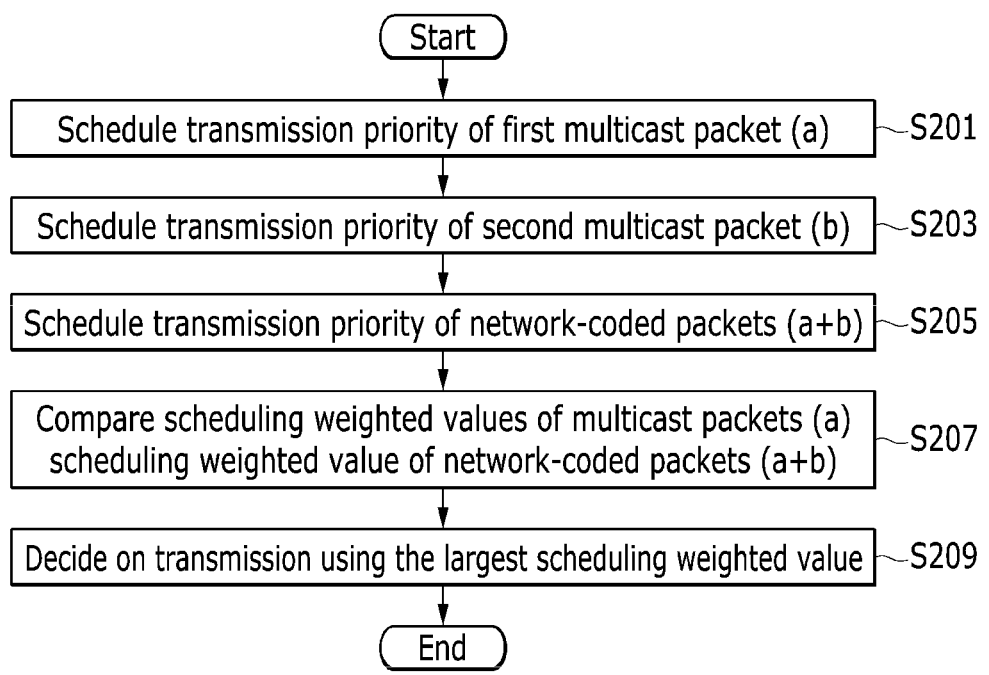
FIG. 8 is a flowchart showing a scheduling control method according to an exemplary embodiment of the present invention.

FIG. 8 is a flowchart showing a scheduling control method according to an exemplary embodiment of the present invention, which is a sequential chart explaining in detail the operation of the scheduler 509 of FIG. 6.

As used herein, scheduling control is classified into a "scheduling/routing" algorithm for individual multicast packets (a) and (b) and a "scheduling/routing/coding" algorithm for network-coded packets (a+b).

The "scheduling/routing/coding" algorithm determines the priority and direction of transmission of multicast packets/multicast links (k, {$i_1, \ldots, i_n$}) and whether to apply network coding or not, and is implemented using packet queue length information between neighboring nodes.

Referring to FIG. 8, the scheduler 509 schedules the transmission priority of a first multicast packet (a) (S201). Also, it schedules the transmission priority of a second multicast packet (b) (S203).

The priority $w_{(k,\{i_1,\ldots,i_n\})}^{D,C}$ transmission of packets in $Q_k^{D,C}$ to n neighboring nodes from node k is calculated according to Equation 2:

$$w_{(k,\{i_1,\ldots,i_n\})}^{D,C}(t) = Q_k^{D,C}(t) - \min_{B \in \mathcal{B}(D,n)} \sum_{j=1}^{n} Q_{i_j}^{B_j,\{k,i_1,\ldots,i_n\}}(t) \quad \text{(Equation 2)}$$

where $B_j$ is a destination node assigned to the jth receiving node, and $i_j$ is the jth receiving node. As a consequence, $$Q_{i_j}^{B_j,\{k,i_1,\ldots,i_n\}}(t)$$

denotes the queue length of the receiving node versus B, and $$\min_{B \in \mathcal{B}(D,n),c} \sum_{j=1}^{n} Q_{i_j}^{b_j,\{k,i_1,\ldots,i_n\}}$$

denotes the sum of queue lengths of B by which the sum of queue lengths of receiving nodes is minimal.

For example, when node 1 divides multicast packets to be transmitted to destination nodes, i.e., node 4, node 5, and node 6 of FIG. 5 for transmission to node 2 and node 3, the priority is calculated according to the following Equation 3:

$$w_{(1,\{2,3\})\{6\},\{1,2,3\}}^{\{4,5,6\},\varnothing}(t) = Q_1^{\{4,5,6\},\varnothing}(t) - (Q_2^{\{4,5\},\{1,2,3\}}(t) + Q_3^{\{6\},\{1,2,3\}}(t)) \quad \text{(Equation 3)}$$

There are various ways of dividing the destination node D into N. Thus, the optimal priority is calculated according to the following Equation 4:

$$w_{(1,\{2,3\})}^{\{4,5,6\},\varnothing}(t) = Q_1^{\{4,5,6\},\varnothing}(t) - \min_{B \in \mathcal{B}(\{4,5,6\},2)} (Q_2^{B_2,\{1,2,3\}}(t) + Q_3^{B_3,\{1,2,3\}}(t)) \quad \text{(Equation 4)}$$

Equation 4 is turned into the above-described Equation 2 by generalization.

Next, the scheduler 509 schedules the priority of transmission of network-coded packets (a+b) (S205).

The packets (a) and (b) to be individually scheduled and routed for transmission can be network-coded and transmitted at one time, as shown in FIG. 4. That is, the priority of the network-coded packets (a+b) is determined by the sum of the scheduling/routing weighted values of the packets to be coded and transmitted at one time. That is, the scheduling/routing/coding priority for linearly coupling a packet to be transmitted through scheduling/routing with the weighted value $w_{(k,I_1)}^{D_1,C_1}(t)$ and a packet to be transmitted through scheduling/routing with the weighted value $w_{(k,I_2)}^{D_2,C_2}(t)$ is calculated by the sum of the two weighted values $w_{(k,I_1)}^{D_1,C_1}(t) + w_{(k,I_2)}^{D_2,C_2}(t)$.

In this way, the scheduler 509 calculates the scheduling/routing/coding weighted value for coding and transmitting the packets at one time by calculating the scheduling/routing priority weighted values and then adding them together to satisfy a particular condition.

Afterwards, the scheduler 509 compares the scheduling weighted values of the multicast packets (a) and (b), which are calculated by Equation 2, and the scheduling weighted value of the network-coded packets (a+b), which is calculated in S205 (S207), and determines transmission using the largest scheduling weighted value (S209). That is, the scheduling/routing weighted values and the scheduling/routing/coding weighted value are compared to choose the largest weighted value and transmit the packets.

In this case, in order for the receiving node to perform decoding, all information except information it has to receive should be kept in the decoding buffer 503, and therefore $I_1 \subset C_2$ and $I_2 \subset C_1$ must be satisfied.

When applying this condition to the coding and transmission of n packets to be scheduled and routed, $I_i \subset C_j$ for all $j \leq n$ and $j \neq i$ must be satisfied to enable coding. The scheduling/routing/coding weighted value is calculated by $\Sigma_{i=1}^{n} w_{(k,I_i)}^{D_i,c^i}(t)$.

An exemplary embodiment of the present invention may not only be embodied through the above-described apparatus and method, but may also be embodied through a program that executes a function corresponding to a configuration of the exemplary embodiment of the present invention or through a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A communication device comprising:
    a decoding buffer configured to store a first multicast packet received from a first node and a second multicast packet received from a second node;
    an encoder configured to perform network coding of the first and second multicast packets;
    a transmitter configured to transmit the network-coded packets output from the encoder to the first node and the second node; and
    a scheduler configured to schedule transmission priority of each of the first and second multicast packets,
    wherein the scheduler is configured to compare a scheduling weighted value of the first multicast packet, a scheduled weighted value of the second multicast packet, and a scheduling weighted value of the network-coded packets, to choose the largest scheduling weighted value, and to determine transmission of the packet corresponding to the chosen scheduling weighted value;
    wherein the scheduler is configured to calculate the scheduling weighted value of the network-coded packets by calculating the scheduling weighted value of the first multicast packet and the scheduling weighted value of the second multicast packet and adding the calculated weighted values together.

2. The communication device of claim 1, wherein the communication device further comprises a queue that is separate from the decoding buffer and is matched to buffer nodes having multicast packets and a destination node to store the multicast packets.

3. The communication device of claim 2, wherein the scheduler is configured to schedule transmission priority of each of the first and second multicast packets by using the number of packets stored in the queue and the set of all cases where the destination node is divided into a plurality of subsets, and to combine the scheduling results of the first and second multicast packets together to schedule the transmission priority of the network-coded packets.

4. A scheduling control method comprising:
    scheduling a transmission priority of a first multicast packet by one of a plurality of nodes constituting a network;
    scheduling a transmission priority of a second multicast packet;
    scheduling a transmission priority of the first and second multicast packets, which are network-coded, according to the scheduling of the first multicast packet and the scheduling of the second multicast packet;
    comparing a scheduling weighted value of the first multicast packet, a scheduling weighted value of the second multicast packet, and a scheduling weighted value of the network-coded packets to choose the largest scheduling weighted value; and
    transmitting the packet corresponding to the chosen scheduling weighted value,
    wherein in the scheduling of the transmission priority of the network-coded packets, the scheduling weighted value of the network-coded packets is calculated by a sum of the scheduling weighted value of the first multicast packet and the scheduling weighted value of the second multicast packet.

5. The scheduling control method of claim 4, wherein the transmission priority of the first multicast packet and the second multicast packet is calculated by the following equation:

$$w_{(k,\{i_1,\ldots,i_n\})}^{D,C}(t) = Q_k^{D,C}(t) - \min_{B \in \mathcal{B}(D,n),c} \sum_{j=1}^{n} Q_{i_j}^{b_j,c}$$

where $Q_k^{D,C}(t)$ denotes the number of packets at a given time t whose destination node set is D and which are stored in the packet queue $Q_k^{D,C}$ of buffer node C, B(D, n) denotes a destination node assigned to the jth receiving node, and $i_j$ is the jth receiving node, and as a consequence, $Q_{i_j}^{B_j,\{k, i_1, \ldots i_n\}}(t)$ denotes the queue length of the receiving node versus B, and $$\min_{B \in \mathcal{B}(D,n),c} \sum_{j=1}^{n} Q_{i_j}^{b_j,\{k,i_1,\ldots,i_n\}}$$

denotes the sum of queue lengths of B by which the sum of queue lengths of receiving nodes is minimal.

* * * * *